(12) United States Patent
Vulovic (10) Patent No.: US 7,098,622 B2
(45) Date of Patent: Aug. 29, 2006

(54) PROGRAMMABLE POWER SUPPLY WITH DUAL MODE CROSS OVER CLAMPS

(75) Inventor: Marko Vulovic, Wharton, NJ (US)

(73) Assignee: Agilent Technologies, Inc., Palo Alto, CA (US)

( * ) Notice: Subject to any disclaimer, the term of this patent is extended or adjusted under 35 U.S.C. 154(b) by 150 days.

(21) Appl. No.: 10/973,297

(22) Filed: Oct. 27, 2004

(65) Prior Publication Data

US 2006/0087871 A1 Apr. 27, 2006

(51) Int. Cl.
*G05B 11/18* (2006.01)

(52) U.S. Cl. .................. 318/590; 318/609; 363/17; 363/97

(58) Field of Classification Search .......... 318/590, 318/596, 599, 609; 363/16–20, 97, 70, 74, 363/75, 95–98, 131
See application file for complete search history.

(56) References Cited

U.S. PATENT DOCUMENTS

| 4,743,815 A | * | 5/1988 | Gee et al. ............. 318/254 |
| 5,719,754 A | * | 2/1998 | Fraidlin et al. ............ 363/17 |
| RE35,806 E | * | 5/1998 | Rossi et al. ............ 318/293 |
| 5,822,198 A | * | 10/1998 | Fraidlin et al. ............ 363/17 |
| 6,388,412 B1 | * | 5/2002 | Reed et al. ............ 318/466 |

* cited by examiner

*Primary Examiner*—Rajnikant B. Patel (57) ABSTRACT

A power supply programmable for a constant current mode and a constant voltage mode and selectively operable in either mode. Respective circuits associated with each of a constant voltage loop and a constant current loop track a control voltage of the other loop when the other loop is operating closed loop and maintains a control voltage of the open loop at a tracking offset value from the control voltage of the closed loop, allowing the open loop to rapidly assume control of the power supply during a mode transition. The tracking offset value is briefly increased during a mode transition to interrupt oscillation tendencies, resulting in faster mode cross-over and reduced overshoots, while maintaining stability.

17 Claims, 6 Drawing Sheets

PROGRAMMABLE POWER SUPPLY WITH DUAL MODE CROSS OVER CLAMPS

CROSS-REFERENCE TO RELATED APPLICATIONS

Not Applicable

BACKGROUND OF THE INVENTION

In a programmable DC power supply having a CV mode and a CC mode, modes of operation are implemented with a voltage feedback loop for the CV mode and a current feedback loop for the CC mode, both attempting to regulate their respective parameter to user-specified settings. The DC operating point is determined by a combination of a load line, the large signal voltage-current (V-I) relationship of the load, and either a CV setting or a CC setting, whichever is lower, i.e., whichever setting results in a lower output power level. In the CC and CV modes of operation, the loop that is not regulating opens and relinquishes control to the other loop. Changes in the load may cause the operating point to vary such that the power supply switches modes (CV mode to CC mode or CC mode to CV mode), which is termed mode cross-over.

During a mode cross-over, the loop which was not in control (i.e., open) when the mode cross-over began, seizes control of the supply (i.e., closes) and stabilizes. In an ideal case, the mode cross-over transition is seamless and the supply immediately begins regulating the new parameter. In practice, however, the transition takes a finite amount of time, referred to as mode cross-over latency, during which the operating point may exceed the bounds set by the CV and CC settings. An amount by which the operating point exceeds the set bounds is referred to as mode cross-over overshoot. An amplitude and duration of the mode cross-over overshoots are directly related to a magnitude of the mode cross-over latency.

Conventionally, tracking clamps have been used in an effort to reduce mode cross-over over shoot, however such clamps have a tendency to cause non-linear mode cross-over oscillations (rapid, perpetual switching between CV and CC), making them unusable. These problems have led to the general practice of using a tracking clamp on only one control loop, optimizing mode cross-over overshoots on either the CV to CC, or the CC to CV transition, but not both.

SUMMARY OF THE INVENTION

In the present invention, a pair of clamps, one for the CV loop and one for the CC loop, continually regulate (or clamp) the control voltage of the open loop to be a small, fixed voltage, referred to as a tracking offset, above a voltage of the closed loop, allowing the open loop to rapidly assume control of the power supply should the programmed limit of the open loop be exceeded. The rapid assumption of control dramatically reduces the mode cross-over latency and consequently, the severity of the associated overshoots.

The present invention addresses the tendency of the tracking clamps to cause the power supply to oscillate. The tendency to oscillate is suppressed by incorporating a circuit that briefly increases the tracking offset of the CC clamp in response to a CV to CC mode transition, temporarily reducing sensitivity of the CC clamp, thereby interrupting any impending oscillation. Alternatively, comparable results are achievable by incorporating a similar circuit in the CV clamp instead of the CC clamp. Briefly increasing the tracking offset allows the use of dual clamps, which results in a programmable power supply with much faster mode cross-over transitions, overshoots that are either substantially reduced or completely eliminated, without generating secondary adverse effects on other aspects of power supply performance, such as for example, stability.

BRIEF DESCRIPTION OF THE DRAWINGS

The present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
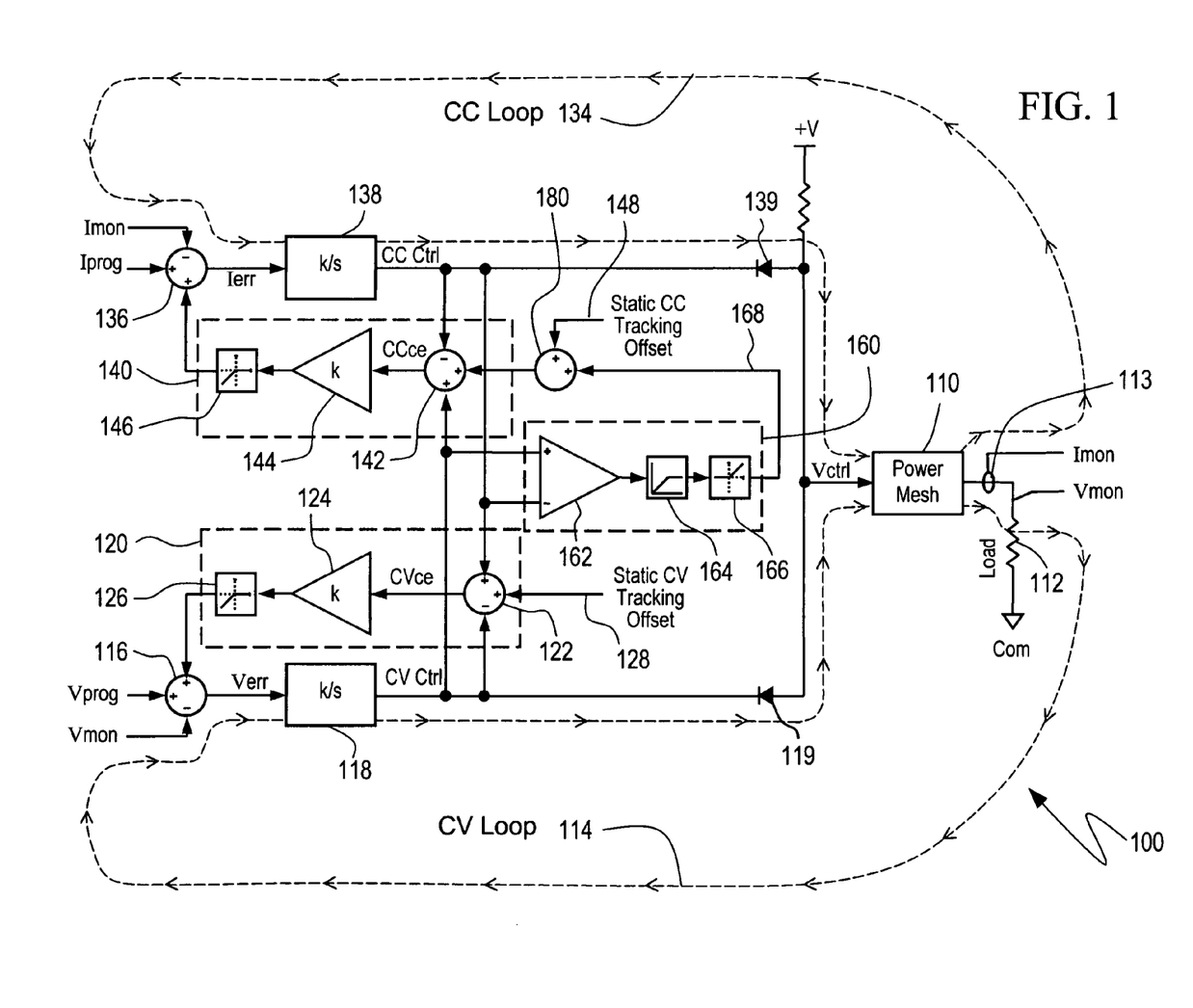
FIG. 1 is a block diagram of a first embodiment of the present invention.

Referring now to FIG. 1, a power supply 100 according to the present invention comprises a power mesh 110 which drives a user's load 112 in response to a voltage $V_{ctrl}$ to produce a current $I_{mon}$ through the load 112 and a voltage $V_{mon}$ across the load 112. The voltage $V_{ctrl}$ is selectively controlled by a CV loop 114 and a CC loop 134. The CV loop 114 and the CC loop 134 demand power necessary to regulate voltage and current, respectively, by amplifying an error signal, i.e., differences between user settings, $V_{prog}$ and $I_{prog}$, and actual operating points $V_{mon}$ and $I_{mon}$, respectively. An adder 116 provides a difference signal $V_{err}$ which is amplified by a CV error amplifier 118 to provide a control voltage $CV_{ctrl}$ for the CV loop 114. An adder 136 provides a difference signal $I_{err}$ which is amplified by a CC error amplifier 138 to provide a control voltage $CC_{ctrl}$. The respective transfer functions (k/s) of the error amplifiers 118 and 138 are application specific and preferably linear.

The voltage $V_{ctrl}$ which drives the power mesh 110 is derived from the voltages $CV_{ctrl}$ and $CC_{ctrl}$. In response to the voltage $V_{ctrl}$, the power mesh 110 drives the load in accordance with $V_{ctrl}$. A relationship between the voltage $V_{ctrl}$ and the power supplied by the power mesh 110 is monotonic, but not necessarily linear. $V_{mon}$ and $I_{mon}$ are then fed-back, which represent the voltage across the load 112 and the current through the load 112, respectively. The voltage $V_{mon}$ may be provided by directly monitoring a voltage at the load 112 and $I_{mon}$ may be provided by a current monitor 113. Suitable current monitors are well known in the art of power supplies and will not be further described.

The voltage $V_{ctrl}$ is maintained at a diode drop above the lower of the voltages $CV_{ctrl}$ and $CC_{ctrl}$ through diodes 119 and 139, respectively, allowing the loop 114 or 134 demanding the least power to forward bias the respective diode, 119 or 139, to control the power mesh, leaving the other diode, 119 or 139, reverse-biased. This arrangement inherently means that the loop not in control (i.e., open), if un-bounded, will force the respective control voltage, $I_{err}$ or $V_{err}$, up until the output, $CC_{ctrl}$ or $CV_{ctrl}$, of the respective error amp, 138 or 118, saturates.

$CV_{ctrl}$ and $CC_{ctrl}$ are generally subject to slew limits, either as a direct result of the transfer functions of error amps 118 and 138, respectively, or due to an amplifier parasitic parameter. The slew limits have a side-effect of causing the control voltage of the open loop (which is saturated high) to be slow to slew down past that of the closed loop and assume control when necessary due to a magnitude of a difference between the voltage of the open or non controlling loop and the voltage of the closed or controlling loop.

The power supply 100 further comprises a CV clamp 120, a CC clamp 140, a dynamic offset injector 160 and an adder 180 which are adapted to control differences between the loop voltage of the open loop and the loop voltage of the closed loop, regulating the control voltage of the open loop to be very near that of the closed loop.

The CV clamp 120 comprises an adder 122, a CV clamp error amplifier 124 and a clipper 126. The CC clamp 140 comprises an adder 142, a CC clamp error amplifier 144 and a clipper 146. The dynamic offset injector 160 comprises a comparator 162, a high pass filter 164 and a clipper 166.

The adder 122 provides a control signal CV clamp error $CV_{ce}$ by subtracting the voltage $CV_{ctrl}$ from the voltage $CC_{ctrl}$ and adding a static CV tracking offset voltage 128. The adder 142 provides a control signal CC clamp error $CC_{ce}$ by subtracting the voltage $CC_{ctrl}$ from the voltage $CV_{ctrl}$ and adding a sum of a static CC tracking offset 148 and a pulse 168 output by the dynamic tracking offset injector 160. The pulse 168 occurs at a time of mode transition as further explained below.

The CV clamp error signal $CV_{ce}$ is provided to the CV clamp error amplifier 124. An output of the CV clamp error amplifier 124 is clipped by the clipper 126 so that only negative voltages pass through the clipper 126. The clipped clamp error signal is fed into the adder 116 and summed with $V_{prog}$ and $V_{mon}$ to regulate the open loop control voltage. The clipper 126 allows the CV clamp 120 to reduce the CV loop control voltage $CV_{ctrl}$ but not increase the CV loop control voltage $CV_{ctrl}$.

In an analogous manner, the CC clamp error signal $CC_{ce}$ is provided to the CC clamp error amplifier 144. An output of the CC clamp error amplifier 144 is clipped by the clipper 146 so that only negative voltages pass through the clipper 146. The clipped clamp error signal is provided to the adder 136 and summed with $I_{prog}$ and $I_{mon}$ to regulate the open loop control voltage. The clipper 146 allows the CC clamp 140 to reduce the CC loop control voltage $CC_{ctrl}$ but not increase the CC loop control voltage $CC_{ctrl}$.

To enhance stability, the dynamic offset injector 160 adds the pulse 168 to the CC tracking offset 148 when comparator 162 detects that the CC loop 134 assumes control. The addition of the pulse 168 temporarily increases the tracking offset of the CC clamp, thereby reducing a likelihood that a rapid subsequent transition into the CV mode, accompanied by a small perturbation on the CV control voltage, will cause an undesired transition back into CC mode, thus initiating an oscillation.

Figure 2:
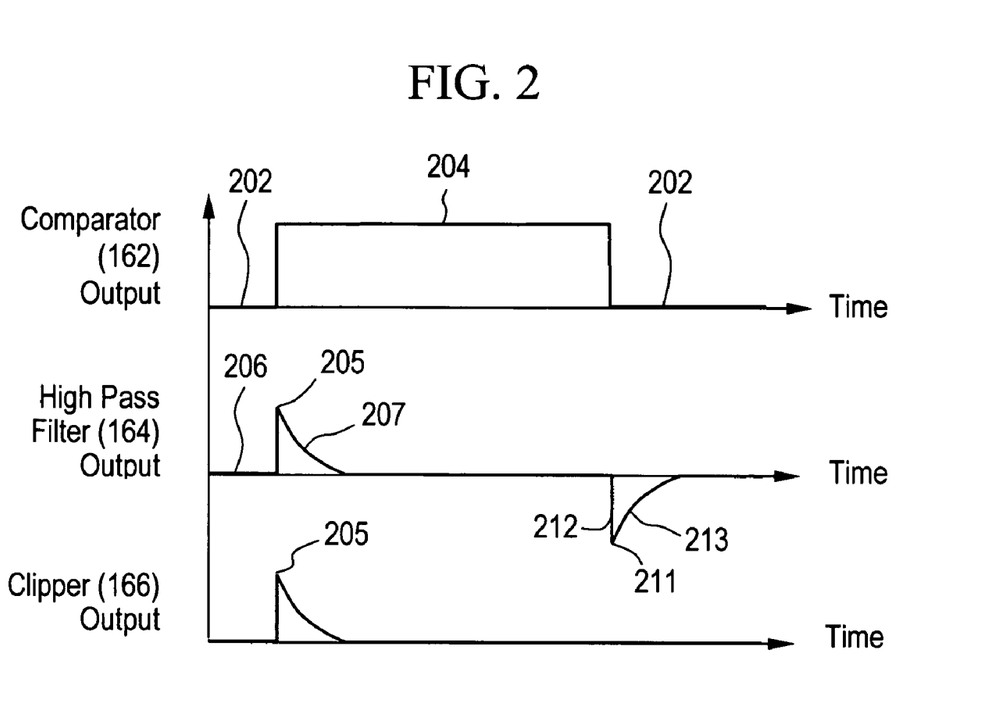
FIG. 2 is a waveform diagram illustrating waveforms within the embodiment shown in FIG. 1.

The dynamic offset injector 160 further comprises a high pass filter 164 and a clipper 166. Operation of the high pass filter 164 and the clipper 166 will be explained using the waveforms shown in FIG. 2. The output of the comparator 162 changes from a low value to a high value 204 during a transition from a first mode of operation (CC) to a second mode of operation (CV) of the power supply and from the high value 204 to the low value 202 during a transition from the second mode of operation (CV) to the first mode of operation (CC). During the transition of the comparator 162 from the low value 202 to the high value 204, the high pass filter 164 outputs a voltage having a waveform 205 with an initial step value 206 and a decay time 207. During the transition of the comparator 162 from the high value 204 to the low value 202, the high pass filter 164 outputs a voltage having a waveform 211 with an initial step value 212 and a decay time 213. The clipper 166 passes only the waveform 205 and rejects the waveform 211 so that only the waveform 205 is applied to the adder 180 as the injected offset 168. A time constant of the high pass filter 166 determines the decay time 207 and thus a duration of the injected offset 168. The time constant is made long enough to ensure that cross-over transients abate and that the operating point stabilizes. The initial step value 206 of the waveform 205 is made large enough to ensure that the clamp 140 avoids mode changes due to the cross-over transients.

Figure 3A:
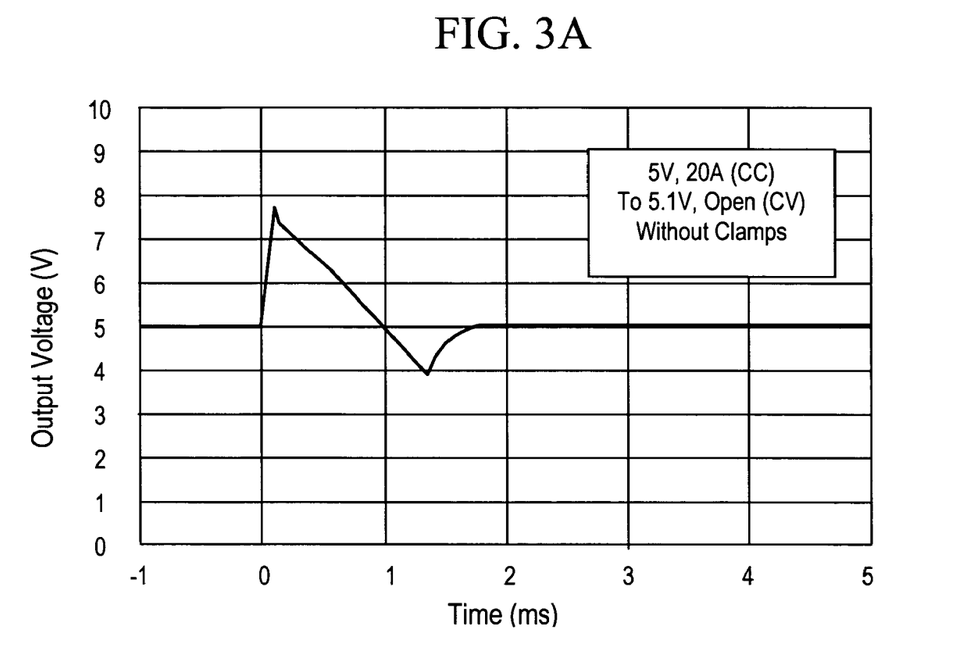
FIG. 3A is a plot of a power supply output voltage during a transition from CC mode to CV mode in a conventional 5 V, 20 A power supply.
Figure 3B:
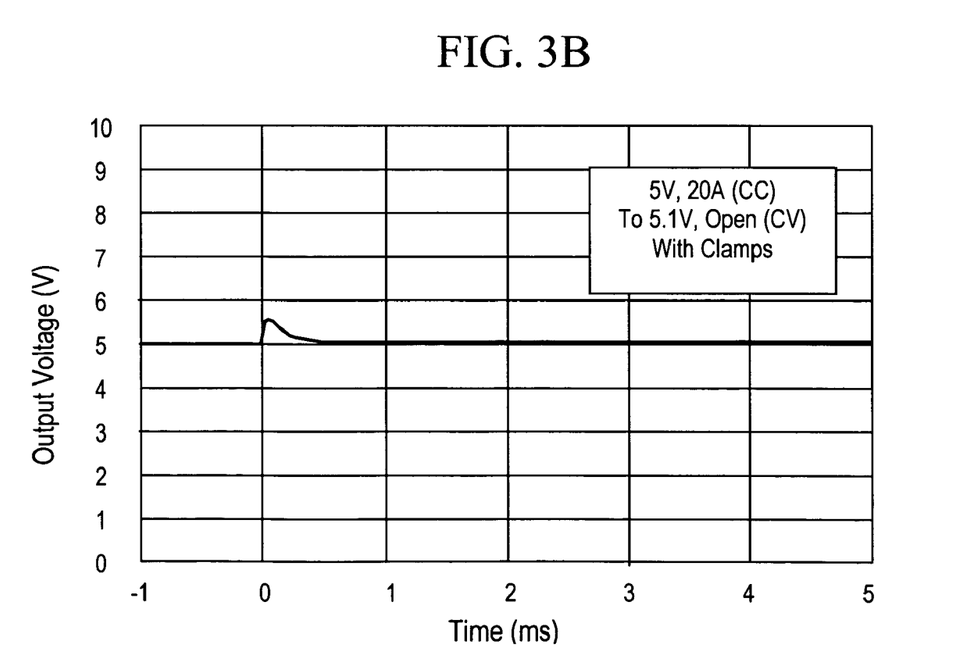
FIG. 3B is a plot of a power supply output voltage during a transition from CC mode to CV mode in a 5 V, 20 A power supply according to the present invention.
Figure 4A:
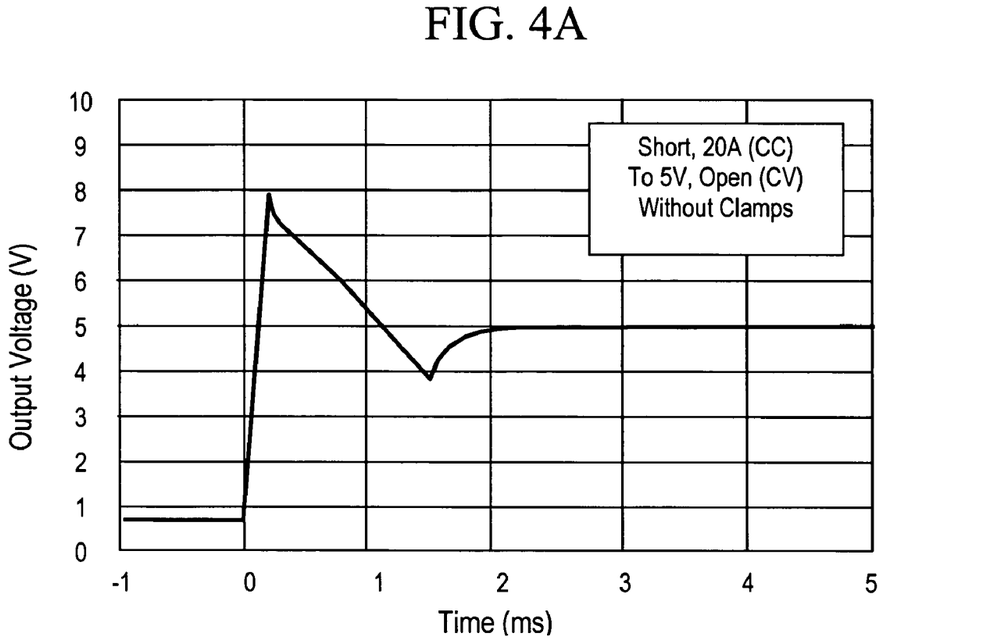
FIG. 4A is another plot of a power supply output voltage during a transition from CC mode to CV mode in a conventional 5 V, 20 A power supply.
Figure 4B:
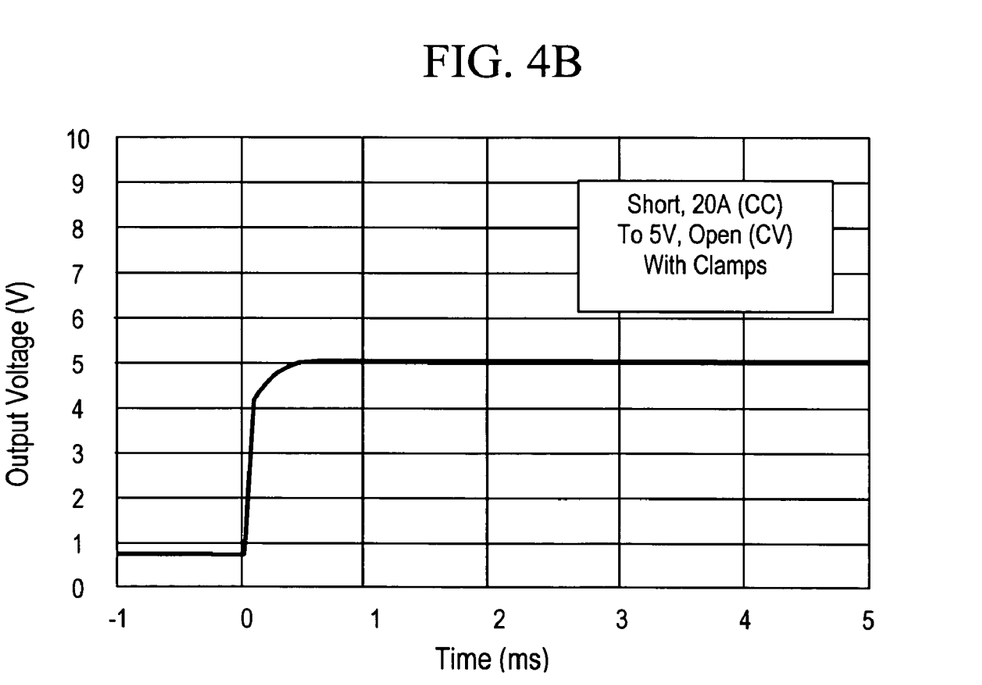
FIG. 4B is another plot of a power supply output voltage during a transition from CC mode to CV mode in a 5 V, 20 A power supply according to the present invention.
Figure 5A:
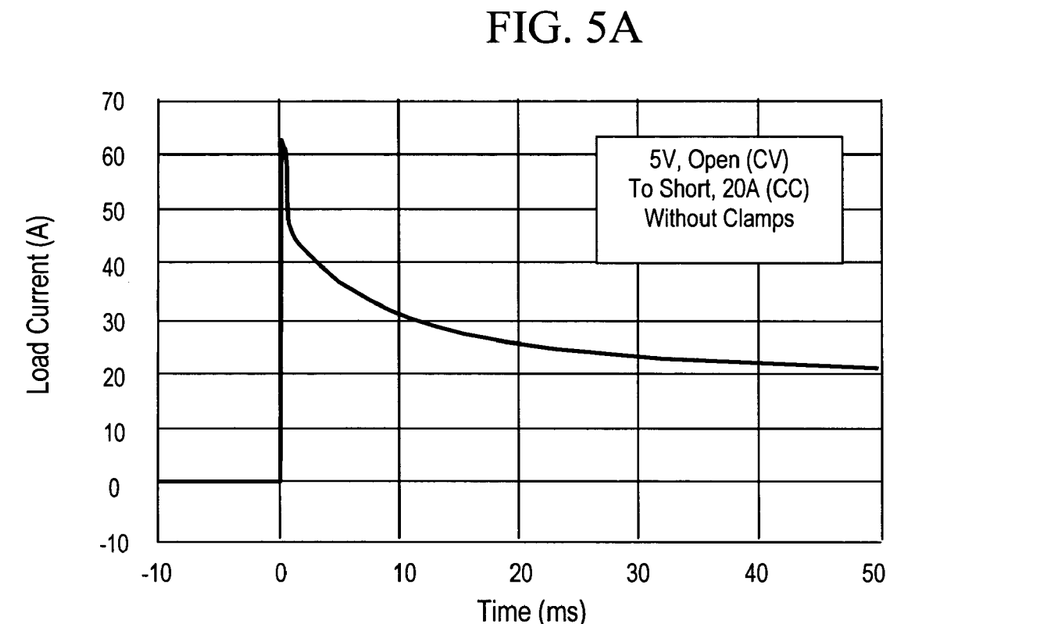
FIG. 5A is a plot of power supply output voltage during a transition from CV mode to CC mode in a conventional 5 V, 20 A power supply.
Figure 5B:
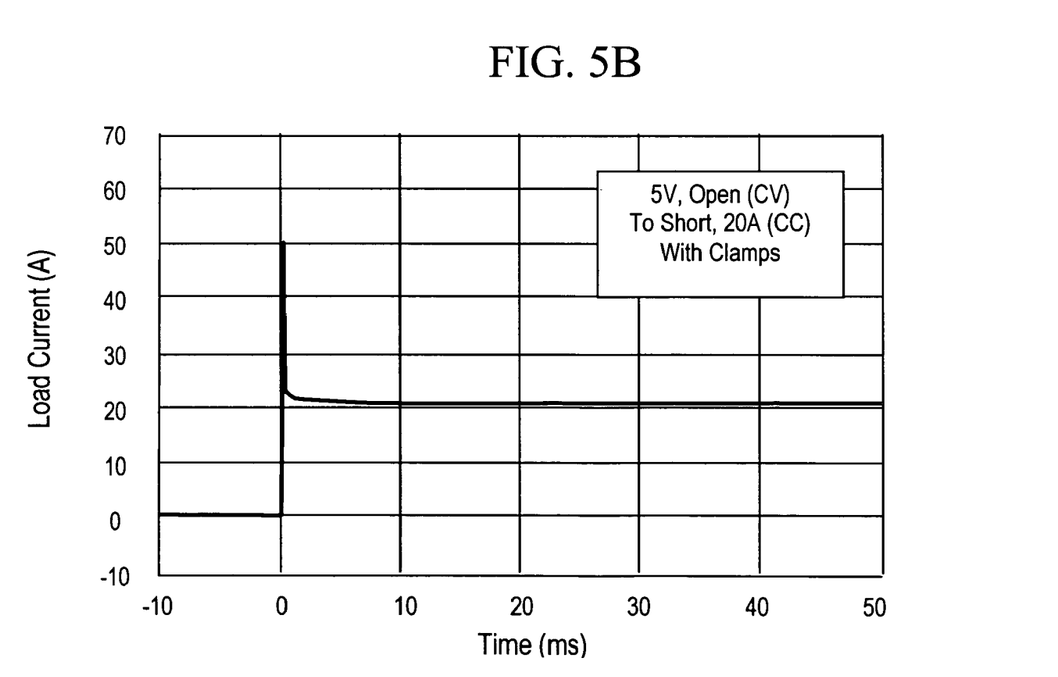
FIG. 5B is a plot of power supply output voltage during a transition from CV mode to CC mode in a 5 V, 20 A power supply according to the present invention.

Comparative results for several examples of responses to operating mode transitions are shown in FIGS. 3A through 5B. In FIGS. 3A, 4A and 5A, the mode transitions in response to load transients are shown with the clamps 120 and 140 functionally disabled, such as, for example, by temporarily removing the outputs of clamps 120 and 140 from the adders 116 and 136, respectively. In FIGS. 3B, 4B and 5B, the mode transitions in response to load transients are shown with the clamps 120 and 140 enabled as shown in FIG. 1.

Referring now to FIG. 3A, during a first example of mode transition, at time (t=0), the power supply is operating in the CC mode, supplying 20 amps (A) to the load at 5 V, and the load switches to an open-circuit, causing the power supply to switch to the CV mode at 5.1 V. In the first example, the clamps 120 and 140 are disabled as described above. At the load transition (t=0), the output voltage initially overshoots to about 7.5 V, decaying to about 5 V after about 1 ms, undershooting to about 4 V for about 0.7 ms and then settling to about 5.1 V at about 2 ms without overshooting.

Referring now to FIG. 3B, during a second example of mode transition, at t=0, the power supply is operating in the CC mode, supplying 20 A to the load at 5 V, and the load switches to an open circuit, causing the power supply to switch to CV mode at 5.1 V. During the second example, the clamps 120 and 140 are enabled. At the load transition (t=0), the output voltage initially overshoots to only about 5.5 V and then settles to about 5.1 V at about 0.5 ms without undershooting.

Referring now to FIG. 4A, during a third example of mode transition, at t=0, the power supply is operating in the CC mode, supplying 20 A into a short circuit at about 0.8 V, and the load switches to an open-circuit, causing the power supply to switch to the CV mode, at 5 V. During the third example, the clamps 120 and 140 are disabled as described above. At the load transition (t=0), the output voltage initially overshoots to about 8 V, decaying to about 5 V after about 1 ms, undershooting to about 3.8 V for about 0.6 ms, and then settling to about 5 V at about 2.3 ms after t=0.

Referring now to FIG. 4B, during a fourth example of mode transition, at t=0, the power supply is operating in the CC mode, supplying 20 A into a short circuit at about 0.8 V, and the load switches to an open-circuit, causing the power supply to switch to the CV mode, at 5 V. During the fourth example, the clamps 120 and 140 are enabled. At the load transition (t=0), the output voltage rises and settles to about 5 V within about 0.5 ms without overshooting.

Referring now to FIG. 5A, during a fifth example of mode transition, at t=0, the power supply is operating in the CV mode supplying about 5 V into an open circuit and the load switches to a short circuit, causing the power supply to switch to the CC mode, supplying 20 A. During the fifth example, the clamps 120 and 140 are disabled as described above. The load current initially overshoots to about 63 A and begins to approach the 20 A value only after about 50 ms.

Referring now to FIG. 5B, during a sixth example of mode transition, at t=0, the power supply is operating in the CV mode supplying about 5 V into an open circuit and the load switches to a short circuit, causing the power supply to switch to the CC mode, supplying 20 A. During the sixth example of mode transition, the clamps 120 and 140 are enabled. The load current initially overshoots to about 50 A, rapidly returns to a level near the programmed value within about 2 ms and reaches the programmed value of about 20 A within less the 10 ms.

As shown by the above examples, the present invention achieves significant reductions in overshoot during mode transitions and significant improvement in settling time after the mode transitions.

Figure 6:
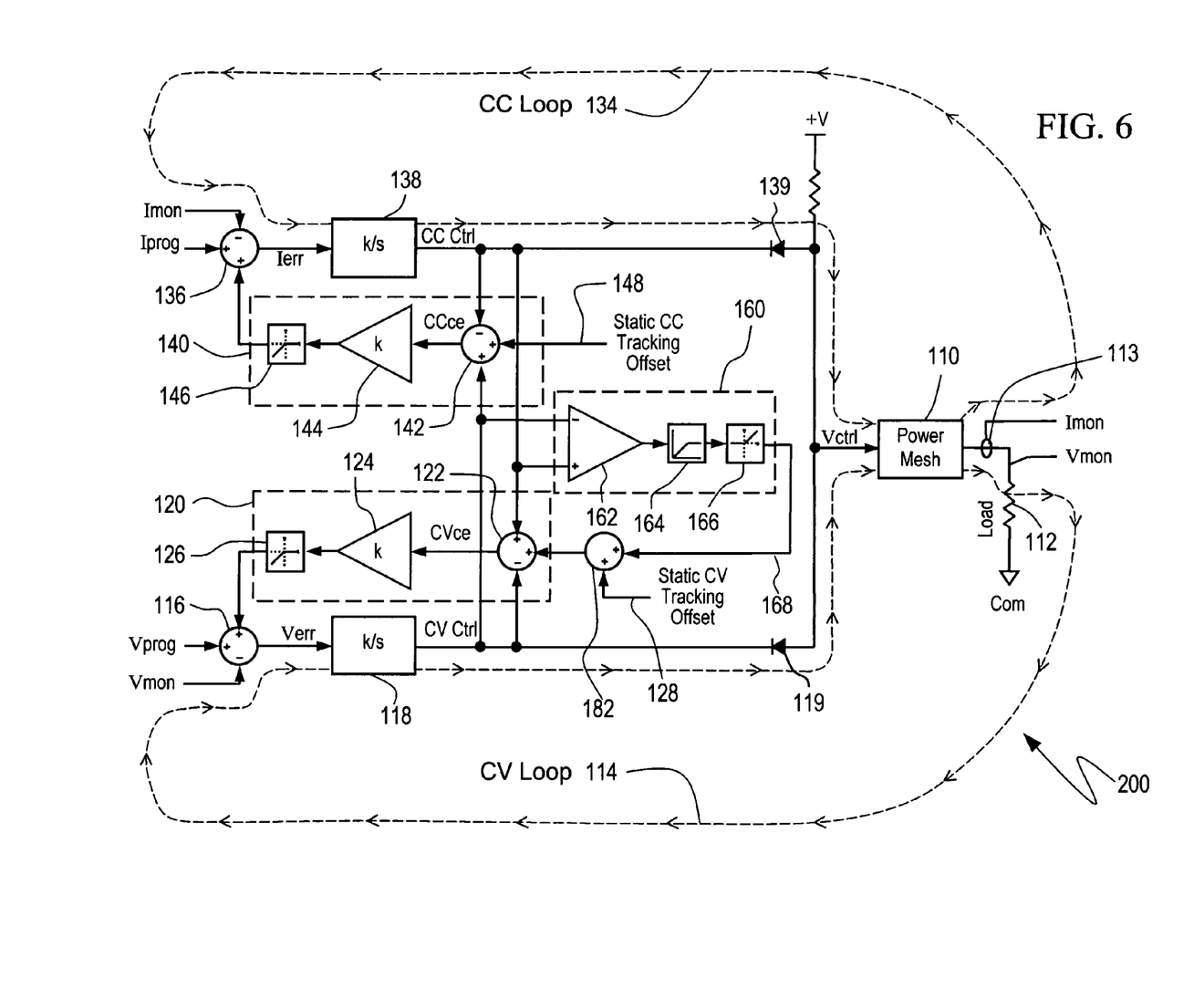
FIG. 6 is a block diagram of a second embodiment of the present invention.

Referring now to FIG. 6, a power supply 200 according to a second embodiment of the present invention is illustrated. The power supply 200 operates in a similar manner as the power supply 100. The difference between power supply 100 and the power supply 200 is the point of injection of the output pulse 168 of the dynamic offset injector 160 and the polarity of the inputs of the comparator 162. As shown in FIG. 6, the pulse 168 is provided to an adder 182 and summed with the static CV tracking offset 128 and the sum of the pulse 168 and the static CV tracking offset 128 is provided to the CV clamp 120 so that clamp 120 avoids unintended mode changes due to cross-over transients.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A programmable power supply having a voltage control mode and a current control mode and selectively operable in each mode, the programmable power supply comprising:
   a power mesh which drives a load in response to a first control voltage or a second control voltage;
   a voltage control loop which generates the first control voltage and provides the first control voltage to the power mesh during the voltage control mode;
   a current control loop which generates the second control voltage and provides the second control voltage to the power mesh during the current control mode;
   a first tracking clamp which maintains the first control voltage offset from the second control voltage by a first predetermined value during the current control mode;
   a second tracking clamp which maintains the second control voltage offset from the first control voltage by a second predetermined value during the voltage control mode; and
   a dynamic offset injector which senses a mode transition and outputs a third control voltage to the first tracking clamp or the second tracking clamp to alter the first predetermined value or the second predetermined value, respectively, during the mode transition.

2. The programmable power supply of claim 1, wherein the dynamic offset injector comprises:
   a comparator having an output which changes state in response to a change in relative values of the first and second control voltages; and
   a pulse generator which generates the third control voltage in response to the state change of the comparator output.

3. The programmable power supply of claim 2, wherein the pulse generator comprises:
   a high pass filter which passes positive and negative going pulses associated with rising and falling edges of the comparator output; and
   a clipper which passes one of the positive and negative pulses as the third control voltage.

4. The programmable power supply of claim 1, wherein the first tracking clamp comprises:
   an adder which adds a first offset voltage and a difference between the first and second control voltages to output an added value,
   an error amplifier which amplifies the added value, and
   a clipper which limits the amplified added value to a predetermined range and outputs a clipped voltage to the voltage control loop to maintain the first control voltage offset during the current control mode.

5. The programmable power supply of claim 1, wherein the second tracking clamp comprises:
   an adder which adds a first offset voltage and a difference between the first and second control voltages to output an added value,
   an error amplifier which amplifies the added value, and
   a clipper which limits the amplified added value to a predetermined range and outputs a clipped voltage to the current control loop to maintain the second control voltage offset during the voltage control mode.

6. A method of operating a programmable power supply having a voltage control mode and a current control mode and selectively operable in each mode, the method comprising:
   providing a power mesh which drives a load in response to a first control voltage or a second control voltage;
   generating the first control voltage and providing the first control voltage to the power mesh during the voltage control mode;
   generating the second control voltage and providing the second control voltage to the power mesh during the current control mode;
   maintaining the first control voltage offset from the second control voltage by a first predetermined voltage during the current control mode;
   maintaining the second control voltage offset from the first control voltage by a second predetermined voltage during the voltage control mode; and momentarily adjusting the first control voltage offset or the second control voltage offset during a mode transition.

7. The method of claim 6, wherein the momentarily adjusting of the first control voltage or the second control voltage comprises:
   sensing a mode transition; and
   generating a pulse to adjust the first control voltage or the second control voltage in response to the sensed mode transition.

8. The method of claim 7, wherein the sensing of the mode transition comprises:
   comparing relative values of the first and second control voltages; and
   initiating the pulse based on the comparison.

9. A programmable power supply having a voltage control mode and a current control mode and selectively operable in each mode, the programmable power supply comprising:
   means for driving a load in response to a first control voltage or a second control voltage;
   means for generating the first control voltage and providing the first control voltage to the means for driving the load during the voltage control mode;
   means for generating the second control voltage and providing the second control voltage to the means for driving the load during the current control mode;
   means for maintaining the first control voltage offset from the second control voltage by a first predetermined voltage during the current control mode;
   means for maintaining the second control voltage offset from the first control voltage by a second predetermined voltage during the voltage control mode;
   means for sensing a mode transition; and
   means for outputting a third control voltage to the means for maintaining the first control voltage or the means for maintaining the second control voltage to alter the first predetermined offset voltage or the second predetermined offset voltage, respectively, during the mode transition.

10. The programmable power supply of claim 9, wherein the means for outputting the third control voltage comprises:
    means for comparing relative values of the first and second control voltages; and
    means for generating the third control voltage based on the comparison.

11. The programmable power supply of claim 10, wherein the means for generating the third control voltage comprises:
    means for generating positive and negative pulses associated with the comparison; and
    means for passing one of the positive and negative pulses as the third control voltage.

12. A control circuit for a programmable power supply having a voltage control mode and a current control mode and selectively operable in each mode to control a power mesh which drives a load in response to a first control voltage or a second control voltage, the control circuit comprising:
    a voltage control loop which generates the first control voltage and provides the first control voltage to the power mesh during the voltage control mode;
    a current control loop which generates the second control voltage and provides the second control voltage to the power mesh during the current control mode;
    a first tracking clamp which maintains the first control voltage offset from the second control voltage by a first predetermined value during the current control mode;
    a second tracking clamp which maintains the second control voltage offset from the first control voltage by a second predetermined value during the voltage control mode; and
    a dynamic offset injector which senses a mode transition and outputs a third control voltage to the first tracking clamp or the second tracking clamp to alter the first predetermined value or the second predetermined value, respectively, during the mode transition.

13. The control circuit of claim 12, wherein the dynamic offset injector comprises:
    a comparator having an output which changes state in response to a change in relative values of the first and second control voltages; and
    a pulse generator which generates the third control voltage in response to the state change of the comparator output.

14. The control circuit of claim 13, wherein the pulse generator comprises:
    a high pass filter which passes positive and negative going pulses associated with rising and falling edges of the comparator output; and
    a clipper which passes one of the positive and negative pulses as the third control voltage.

15. The control circuit of claim 12, wherein the first tracking clamp comprises:
    an adder which adds a first offset voltage and a difference between the first and second control voltages to output an added value,
    an error amplifier which amplifies the added value, and
    a clipper which limits the amplified added value to a predetermined range and outputs a clipped voltage to the voltage control loop to maintain the first control voltage offset during the current control mode.

16. The control circuit of claim 12, wherein the second tracking clamp comprises:
    an adder which adds a first offset voltage and a difference between the first and second control voltages to output an added value,
    an error amplifier which amplifies the added value, and
    a clipper which limits the amplified added value to a predetermined range and outputs a clipped voltage to the current control loop to maintain the second control voltage offset during the voltage control mode.

17. A method of operating a programmable power supply having a voltage control mode and a current control mode and selectively operable in each mode to drive a load in response to a first control voltage in the voltage control mode or a second control voltage in the current control mode, the method comprising:
    operating the power supply closed loop in one of the voltage control mode and the current control mode, in response to one of the first control voltage and the second control voltage, respectively;
    maintaining the other one of the first and second control voltages at a predetermined offset relative to the one control voltage to which the power supply is responsive in the closed loop;
    increasing the predetermined offset for a predetermined time at a time of a mode transition from operating closed loop in the one of the voltage control mode and the current control to operating closed loop in the other of the voltage control mode and the current control mode; and
    altering the first control voltage offset or the second control voltage offset during the mode transition.

* * * * *